Aug. 4, 1942.   J. H. FRIDÉN   2,292,266
SLUG CASTING APPARATUS AND METHOD
Filed Aug. 2, 1940   11 Sheets-Sheet 1

Inventor:
John H. Fridén
By his Attorney

Aug. 4, 1942. J. H. FRIDÉN 2,292,266
SLUG CASTING APPARATUS AND METHOD
Filed Aug. 2, 1940 11 Sheets-Sheet 2

Inventor:
John H. Friden
By his Attorney

Aug. 4, 1942.   J. H. FRIDÉN   2,292,266
SLUG CASTING APPARATUS AND METHOD
Filed Aug. 2, 1940   11 Sheets-Sheet 6

Inventor:
John H. Fridén
By his Attorney

Aug. 4, 1942.  J. H. FRIDÉN  2,292,266
SLUG CASTING APPARATUS AND METHOD
Filed Aug. 2, 1940    11 Sheets-Sheet 7

Inventor:
John H. Fridén
By his Attorney
H. C. Messens

Aug. 4, 1942.  J. H. FRIDÉN  2,292,266
SLUG CASTING APPARATUS AND METHOD
Filed Aug. 2, 1940  11 Sheets-Sheet 8

INVENTOR:
John H. Fridén
BY
his ATTORNEY

Patented Aug. 4, 1942

2,292,266

UNITED STATES PATENT OFFICE 2,292,266

SLUG CASTING APPARATUS AND METHOD

John H. Fridén, Maplewood, N. J., assignor to The Sun Tube Corporation, Hillside, N. J., a corporation of New Jersey Application August 2, 1940, Serial No. 349,849

17 Claims. (Cl. 22—76)

This invention relates to improvements in apparatus for and methods of producing slugs of the type employed for the exrusion of shells, cups or containers of various sorts. More particularly it has reference to apparatus and methods by which slugs of this character may be cast as individual units.

Heretofore it has been the common practice to produce slugs for the extrusion of tin containers, zinc cups and the like by stamping discs of the appropriate size from sheets of material having the thickness of the desired slugs. This method involves considerable waste, however, when, as is the common practice, the slugs are stamped from the sheets at the plant where the extrusion of the slugs into the finished article takes place. There is necessarily a great deal of scrap left between the openings from which the slug discs have been stamped and this waste material, according to the usual practice, must be sold at a very low figure and returned to the concerns from whom the original flat sheets are procured. This waste is eliminated through the present invention by the provision of a small unit adapted to cast the material into individual slugs of the desired shape and size. The relatively small amount of scrap developed in the trimming of the extruded tubes or cups may be readily reused in the unit so that there is no loss by way of scrap.

A particular object of the invention has been to produce slugs of the character mentioned which are uniform in thickness and grain structure and are free from defects, such as cracks, surface impurities and the like. Toward this end care is exercised, in accordance with the invention, to prevent the inclusion of scale and other dirt in the material from which the slugs are formed and to eliminate the inclusion of gas bubbles within the slugs as they solidify.

Another object of the invention has been to provide a continuously and automatically operating unit for the production of the individual slugs. The arrangement is such that the slugs are poured and formed in a continuously moving series of molds and are discharged from the molds when thoroughly solidified.

A special feature of the invention is the provision of means for accurately measuring the molten metal discharged into the molds for the formation of each of the slugs.

The invention is particularly adapted for the production of zinc slugs employed in the extrusion of cups for dry batteries. Various special features are provided to enable the continuous formation of slugs of this character having the desired uniformity and perfection. However, the invention is also applicable to the production of slugs of tin, lead, aluminum and similar metals. Moreover, certain phases of the invention are applicable to the production of articles other than individual slugs. For example, slabs may be cast and these may be subsequently rolled and punched to produce slugs, or bars constituting a multiple of slugs may be formed. Articles of any appropriate shape might, in fact, be produced.

Other objects and advantages of the invention will appear from the detailed description of an illustrative form of the same which will now be given in conjunction with the accompanying drawings, in which.

*Furnace construction*

Figure 1:
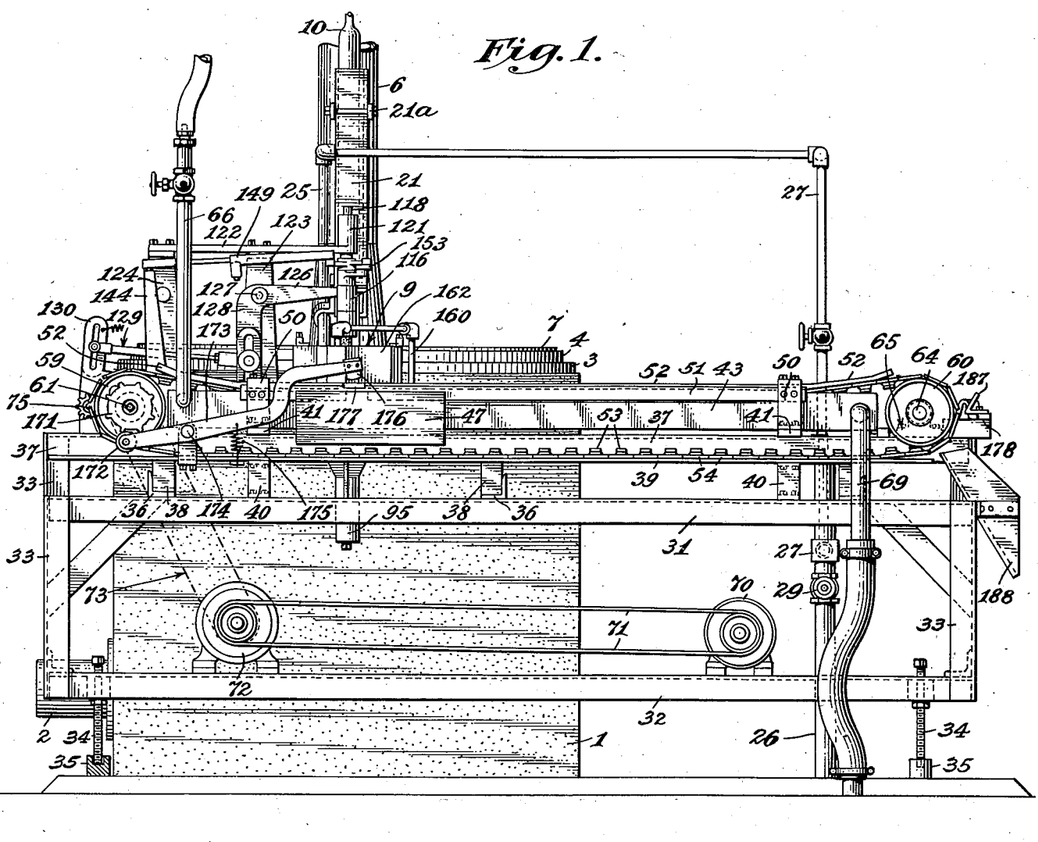
Figure 1 is a front elevational view of a furnace and slug casting unit constructed in accordance with the invention.
Figure 2:
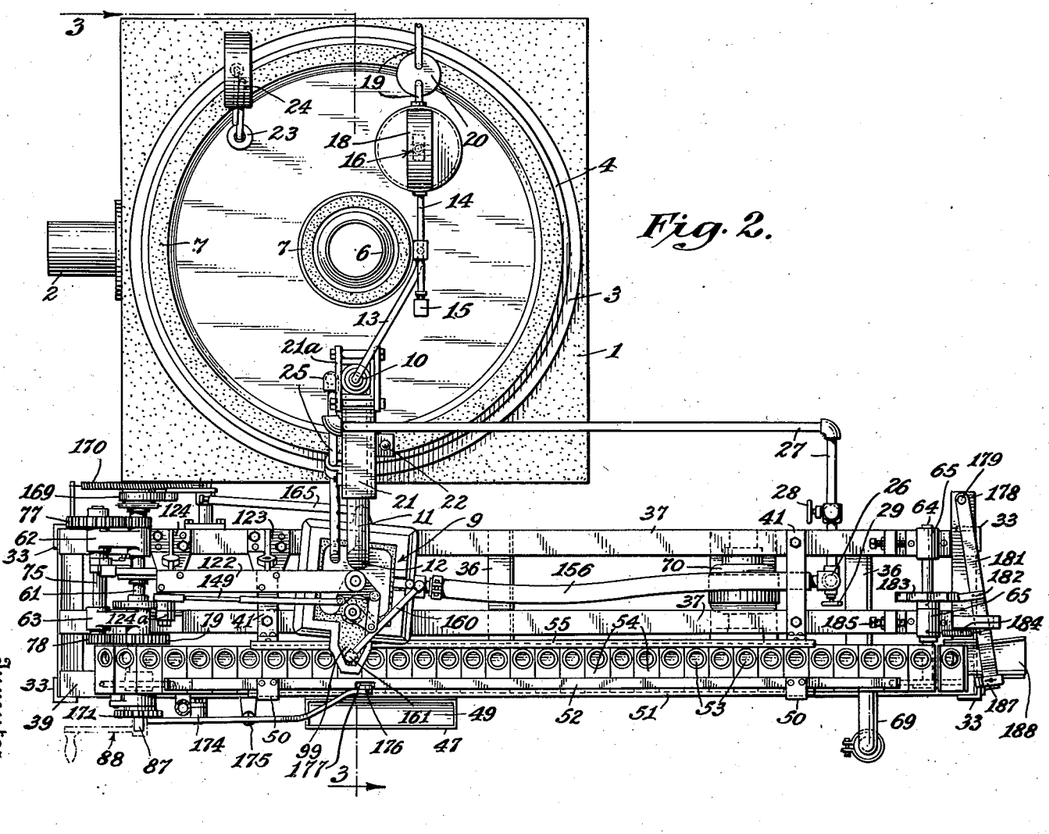
Figure 2 is a top plan view of the apparatus.
Figures 3, 4:
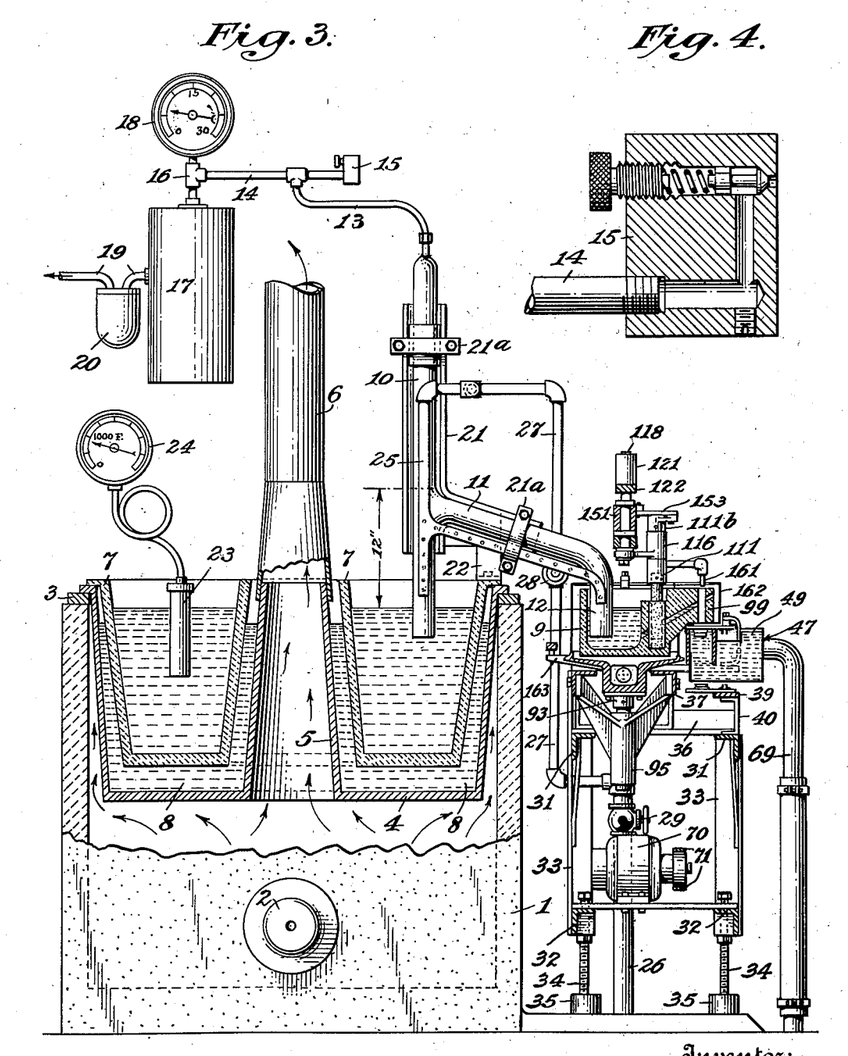
Figure 3 is a vertical section on an enlarged scale taken along the line 3—3 of Figure 2.
Figure 4 is an enlarged detail in section through a safety valve employed in the apparatus.

Referring now to the drawings, particularly Figures 1, 2 and 3, the furnace 1, for melting and retaining the metal from which the slugs are to be cast, is preferably of substantially cubical form. It may be of any suitable material but preferably is of refractory material, such as fire brick. While only a single slug-producing unit is shown in association with the furnace 1, its construction is such as to readily enable a plurality of slug-producing units to be associated with it. For example, two of these units might be disposed on opposite sides of the furnace or a unit might be disposed on each of the four sides of the furnace, if desired.

Heat may be supplied to the furnace in any convenient way, an oil burner 2 being illustrated for this purpose. Preferably the inner wall of the furnace is of cylindrical form and around the top of the cylinder opening there is provided a ring 3, preferably formed of iron or steel. This ring is adapted to support a fire pot 4, which is preferably also formed of metal, such as iron or steel. As shown, the fire pot may be in the form of a truncated cone open at its base, which faces upwardly. An annular flange, extending laterally from the open base, serves to support the fire pot from the ring 3. At the center of the fire pot there is formed a flue 5 in the form of a truncated cone, communicating at its smaller, upper end with a stack 6 adapted to carry off the products of combustion from the furnace 1. Between its outer wall and the flue portion 5, the fire pot forms an annular chamber adapted to receive a crucible 7, preferably formed of some suitable refractory material capable of being molded into the desired shape. This crucible is of a shape similar to the fire pot but it is somewhat smaller in its outer dimension and has its hollow, central, upstanding portion surrounding, but spaced from, the flue 5 of the fire pot. A laterally extending flange, around the top of the crucible, serves to support it from the corresponding flange of the fire pot. Within the annular chamber of the fire pot, and between the walls of the same and the walls of the crucible, there is provided a mass of fusible metal 8, such as lead. This metal should have a lower melting point than that of the metal from which the slugs are formed, the latter being placed in the chamber provided by the crucible 7. Through the use of the lead or other metal in the fire pot the heat supplied to the metal, such as zinc, in the crucible is more readily controlled and overheating of all or a portion of the metal in the crucible is avoided.

*Metal transferring means*

At one side of the furnace 1 there is provided an auxiliary chamber or pot 9 adapted to retain a small quantity of the molten metal and from which the metal to form the slugs is poured or pumped in measured quantities. The metal is transferred from the crucible 7 to the auxiliary chamber or pot 9 by a syphon, formed preferably of silica or other refractory material, having a vertical leg 10 and a downwardly sloping portion 11 terminating in a vertical extension 12. The leg 10 is adapted to extend into the crucible 7 to a point well below the surface of the molten metal therein and it extends upwardly a considerable distance above the point at which the downwardly sloping portion 11 branches off. The vertical extension 12 is disposed within the auxiliary chamber 9 and extends to a point well below the surface of the molten metal therein, when the apparatus is in normal operation.

The upper end of the leg 10 of the syphon is reduced in diameter and connected by means of a tube or hose 13 and a pipe 14 with a T fitting 16 having one branch comunicating with a vacuum tank 17 and its other branch communicating with a vacuum gauge 18. It will be understood that a vacuum pump (not shown), of any suitable construction, is connected with the vacuum tank 17 to maintain any desired degree of vacuum therein. Such a pump may be connected with the tank through a line 19 having interposed therein a filter 20.

By means to be later described, the molten metal delivered by the syphon to the auxiliary chamber 9 is in turn delivered from the latter in measured quantities to suitable molds. The syphon serves to maintain a constant supply of the molten metal in the auxiliary chamber and thus insures the proper delivery of the metal to the molds. To start the syphon, the lower end of the extension 12 may be closed off in any suitable way or a small amount of the metal may be transferred by a suitable dipper or ladle from the crucible 7 to the auxiliary chamber. When the vacuum tank 17 is then made effective upon the syphon, it will permit the atmospheric pressure to force the molten metal to a suitable height in the leg 10 above the point where the portion 11 branches off. The length of the leg 10 and the degree of vacuum employed should be such in relation to the specific weight of the molten metal that there is no danger of forcing the metal into the tube 13 and into the vacuum tank 17. Preferably, the extent of the vacuum is such as to draw the metal merely to a point well below the top of the leg 10 of the syphon. If desired, a safety valve 15 (Fig. 4) may be connected with the pipe 14 so that if the vacuum in the tank 17 exceeds the desired amount, air will be drawn into the pipe 14 through the safety valve. By appropriate adjustment of the thumbscrew, shown in Fig. 4, the point at which the safety valve will open may be varied.

It will be understood that as the metal is maintained by the vacuum at an appropriate height in the leg 10 of the syphon, above the point of juncture between this leg and the portion 11, the syphon will tend to maintain the metal in the crucible 7 and in the auxiliary chamber 9 at substantially the same level. Accordingly, sufficient metal for this purpose will be transferred initially and as metal is withdrawn from the chamber 9, it will be replaced by a flow of the metal from the crucible 7.

Any appropriate means may be provided for supporting the syphon. As best indicated in Figure 3, this may comprise a bracket 21 having a vertical portion paralleling the leg 10 of the syphon and another portion paralleling the hub part 11 of the syphon. The bracket may be provided with a suitable base 22 bolted or otherwise secured to the flange of the crucible 7. Clamps or straps 21a may be employed for retaining the syphon in the appropriate position on the bracket.

The downward slope of the portion 11 of the syphon aids in the proper removal of any air or gas bubbles which may be entrapped in the molten metal and which, if not removed, might produce a defective slug. This removal of occluded gases is important since the presence of a small bubble in a slug is likely to produce a pinhole in the extruded cup or tube. In the use of the syphon any air or gas bubbles in the metal will readily rise and move along the upper surface of the sloping portion 11 of the syphon and hence up the vertical leg 10 to the vacuum tank. The parts 10, 11 and 12 of the syphon are preferably only about one inch in diameter, due to practical considerations, and it is this relatively small gauge of the tubing that creates difficulty in the removal of air or gas bubbles and makes it important to have the shape of the syphon such as to impose as small an obstacle to the movement of the gas bubbles as possible.

Means are preferably provided for either indicating or recording the temperature of the metal in the crucible 7. For this purpose a pyrometer 23, of any suitable construction, may be employed, this being connected with a suitable gauge 24 which will visually indicate the temperature of the metal. If zinc is being used in the production of the slugs, its melting point is about 787° F. and, therefore, the molten metal being syphoned may range from 850° F. to 950° F.

Means are provided for supplying heat to the syphon to prevent the cooling of the metal in transit from the crucible to the auxiliary chamber 9. For this purpose a burner 25 of suitable construction may be employed. This burner is preferably formed with two legs adapted to parallel the vertical leg 10 and the inclined portion 11 together with a part of the vertical leg 12 of the syphon. Suitable apertures are provided in the side of the burner facing the syphon so that a series of flames may be directed against the syphon over the major portion through which the molten metal flows. For the operation of the burner, gas or a mixture of gas and air may be led through a pipe 26 and a branch line 27 (Fig. 3), the latter communicating with the top of the burner. Valves 28 and 29 may be employed in the branch 27 and line 26, respectively, for regulating the flow. The burner may be retained in proper position in relation to the syphon by means of one of the clamps 21a.

Casting unit frame construction

Turning now to the casting machine unit, only one of which is associated with the furnace in Figure 2, this is supported by a main frame preferably formed of a series of angle members. A pair of longitudinally extending angle members 31, disposed at a convenient level above the floor and a similar pair of angle members 32 below the angle members 31, are supported and connected by means of a series of vertically disposed angle members 33, one at each corner of the frame. To permit the height of the frame to be adjusted, and to enable the leveling of the frame, it is supported by a series of four adjustable bolts 34, which are loosely mounted at their lower ends in sockets in a series of blocks 35 serving as feet adapted to rest on the floor. These bolts are threaded through blocks carried by the angle members 32 and are provided with lock nuts beneath these blocks. The bolts are simply turned to effect the adjustment indicated, and the lock nuts are then tightened. A series of transversely extending angle members 36, supported by the angle members 31, serve to complete the main frame and provide a rigid support for the unit as a whole. Above the longitudinal angle members 31 there is another pair of similar angle members 37 parallel with the members 31 but positioned more closely together. One of the members 37 is secured to and supported by a pair of the vertical members 33 while the other member 37 is carried by brackets 38 secured to the transverse members 36. Also, above one of the angle members 31 is a flat bar 39 extending longitudinally of the frame and secured thereto in appropriately spaced relation by means of a number of C brackets 40.

Figure 19:
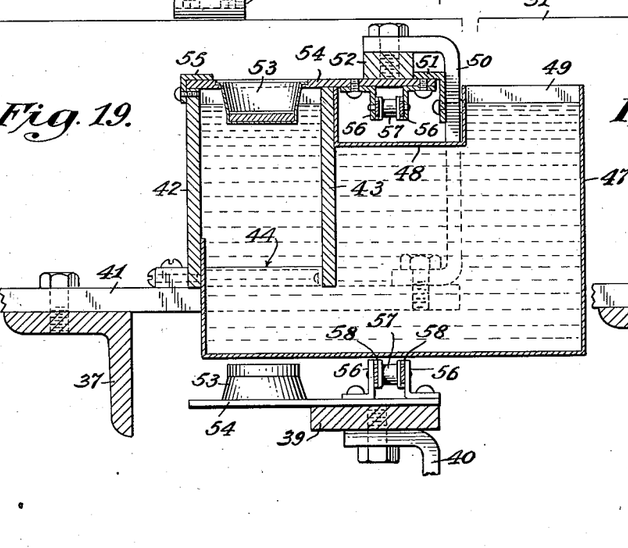
Figure 19 is a transverse vertical section, on an enlarged scale, along the line 19—19 of Figure 18.
Figure 20:
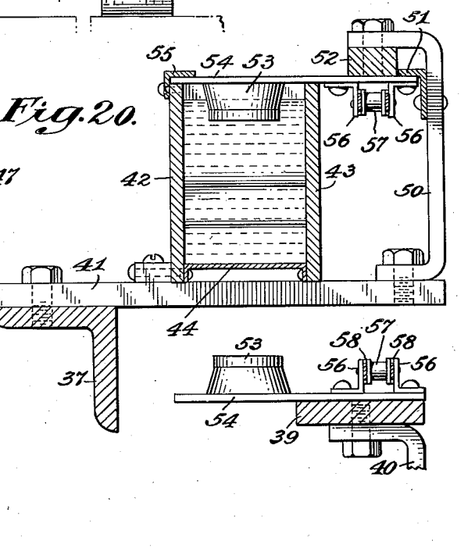
Figure 20 is a transverse vertical section, on a similarly enlarged scale, along the line 20—20 of Figure 18.

A pair of flat bars 41 is disposed transversely across the angle members 37 and is bolted thereto (as best shown in Fig. 19). These transversely extending bars are arranged to support an elongated tank or trough which extends longitudinally of the unit for the major portion of its length. This tank is formed by a pair of side plates 42 and 43, a bottom plate 44 and end plates 45 and 46, all united in an appropriate manner to provide a water-tight reservoir. At an intermediate point (as best shown in Fig. 19), the tank is enlarged in cross section by the introduction of a box-like member 47 in lieu of a portion of the bottom plate 44. The box 47 may be secured to the plates 42 and 43 by welding, or other suitable means, and is arranged to form a water-tight connection with the latter as well as with the abutting ends of the bottom plate 44. At its top the box 47 is partially closed by a channel 48 extending longitudinally along the outer face of the plate 43. An opening 49 into the box at one side of the channel 48 provides ready access to the box for the purposes of inspection and the removal of any metal which may be spilled or otherwise deposited therein during the operation of the unit.

Mold conveyor

Figure 17:
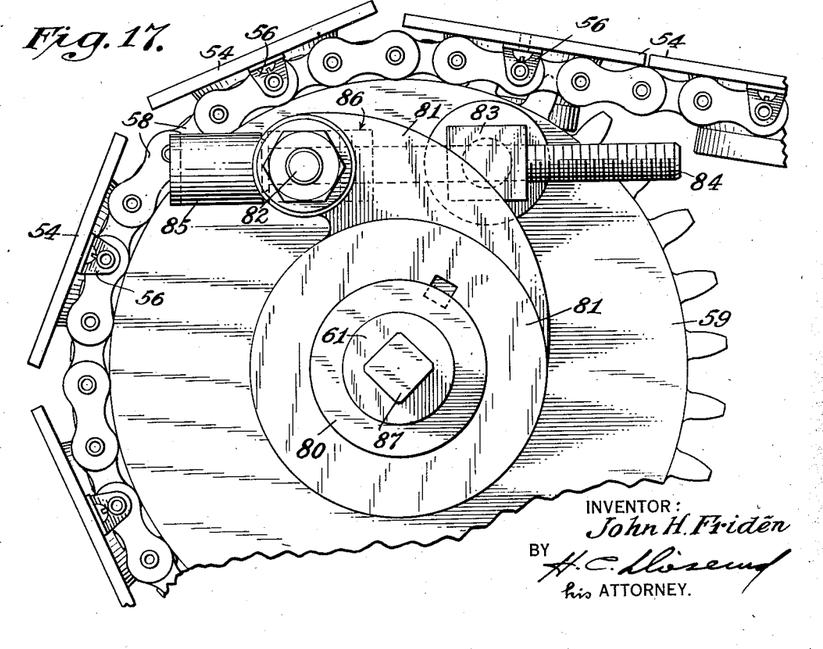
Figure 17 is a fragmentary elevational view taken along the line 17—17 of Figure 16.

Two C brackets 50, secured to the bars 41, carry longitudinally extending angle member 51 and bar 52 which assist in guiding and retaining a mold conveyor, which will now be described. The molds 53, into which the molten metal is poured to produce the slugs, are best shown in Figs. 2, 18, 19 and 20. Each mold is carried by a plate 54 adapted to be supported by, and to slide along, the upper edges of the plates 42 and 43 during a portion of its travel. An angle member 55 extending longitudinally of the plate 42 and secured thereto, with its horizontal leg spaced slightly above the upper edge of the plate, serves to retain and guide one end of each of the mold-supporting plates 54 while the opposite ends of the plates 54 are guided and held in place by the angle member 51 and the bar 52. The plates 54 are connected together by an endless conveyor chain through which the molds are shifted along a predetermined path. For this purpose, there is secured beneath each plate 54 a pair of angle brackets 56 between which is journaled a small roller 57. The pins carrying the rollers 57 are connected by a series of links 58 (best shown in Fig. 17) forming a continuous chain which passes around a pair of sprocket wheels 59 and 60 adjacent the opposite ends of the main frame. The sprocket 59, which is driven, is carried by a shaft 61 journaled in bearing blocks 62 and 63 secured to the angle members 37 while the sprocket 60 is carried by a shaft 64 journaled in bearings 65 secured to the angle members 37.

Figure 18:
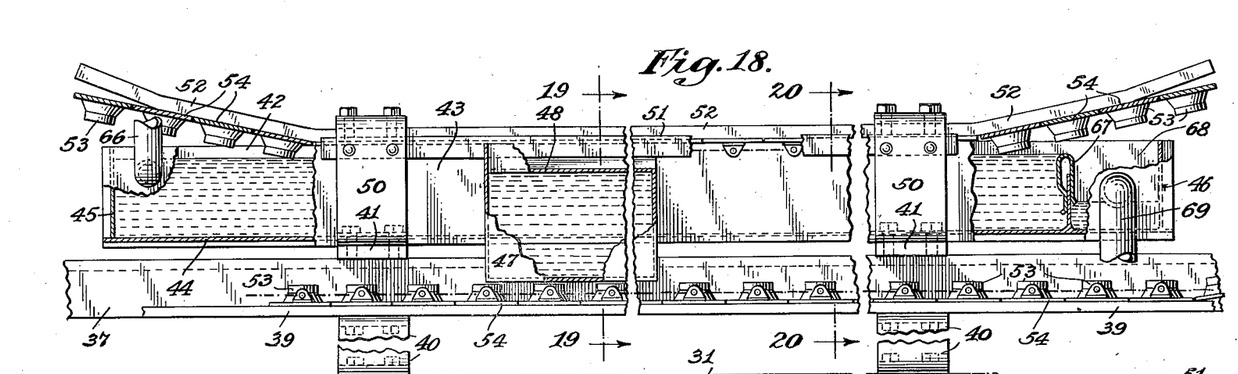
Figure 18 is a front elevational view, partly in section, of a portion of the mold-carrying conveyor, cooling trough and associated devices.

As best shown in Figures 1 and 18, the shafts 61 and 64 are so positioned in relation to other supporting and guiding means for the conveyor that the mold-carrying plates are brought somewhat higher in their travel around the end sprockets than at intermediate portions of their travel. The bar 52 (as shown in Fig. 18) is suitably bent upwardly at its two ends to direct the plates downwardly from the sprocket 59 to the main plane of travel of the upper course of the conveyor and upwardly adjacent the opposite end toward the top of sprocket 60. This arrangement is such that the molds are carried into the elongated tank over the top of the end plate 45 and are then carried through the major portion of the length of the tank with their bottom portions immersed beneath the surface of the water carried by the tank. As the molds approach the opposite end of the tank they will again be raised to clear the end plate 46.

Water is introduced into the elongated tank through an inlet 66 (Figs. 1 and 18), connected in any suitable way with a source of water supply. Preferably the water will be admitted continuously during the operation of the unit. Adjacent the opposite end of the tank an adjustable dam 67 may be employed, this dam being raised to an appropriate height to maintain a desired water level within the tank. As the water is continuously admitted into the tank, the surplus flows over the dam into a small compartment 68 at the end of the tank, from which it is withdrawn by an overflow pipe 69 and passed either to the sewer or to a storage tank for re-circulation.

After the conveyor chain and the molds are carried around the sprocket 60, they are allowed to drop to the surface of the bar 39 (Figs. 19 and 20), which serves to support them on their lower or return course of travel.

Conveyor drive

Figure 12:
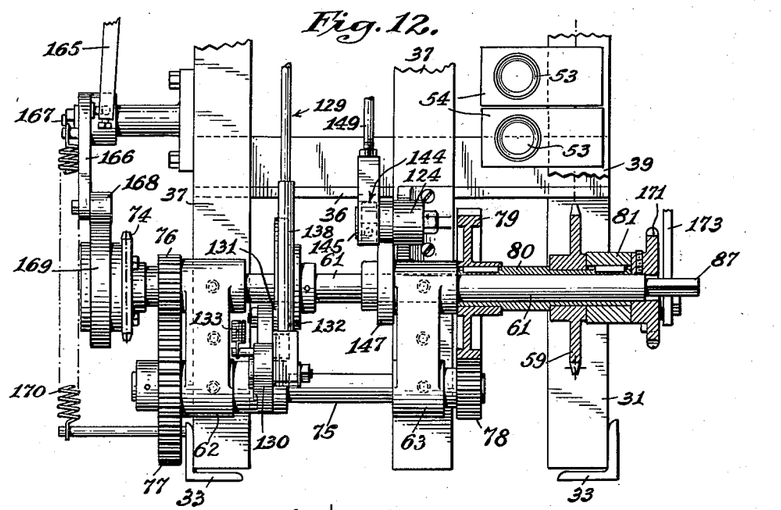
Figure 12 is a plan view, partly in section, illustrating certain of the operating and control devices.
Figure 13:
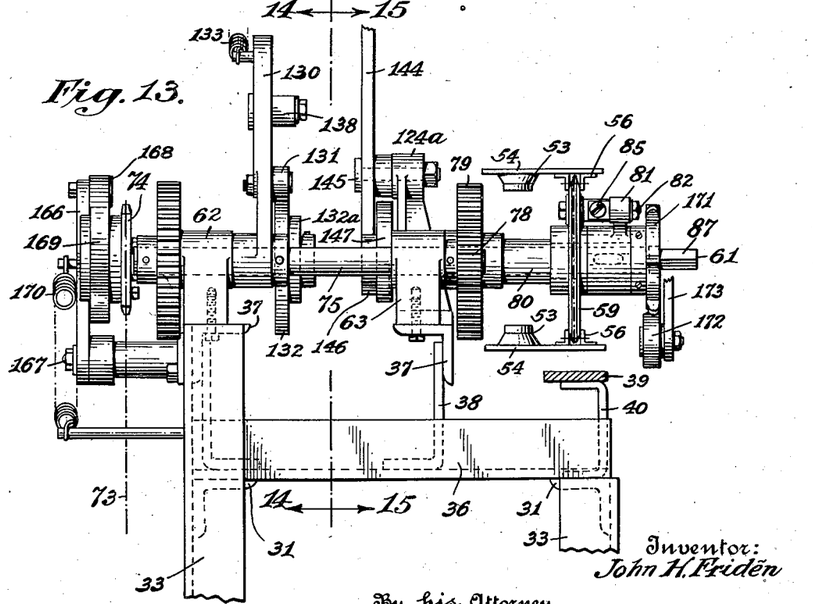
Figure 13 is an elevational view of the devices illustrated in Figure 12.

The means for continuously driving the mold conveyor may comprise a motor 70 (Fig. 1) which, as will be later explained, supplies the motive power for all of the operating portions of the machine. This motor is connected by a belt 71 with a speed-reducing mechanism 72 of any suitable character; it may be a variable speed reducer so that the operation of the machine may be regulated as desired. The opposite end of the speed reducer is connected by a chain 73 with a sprocket 74 (Figs. 12 and 13) secured to the shaft 61. A jack shaft 75, journaled in the same bearing blocks 62 and 63 which carry the shaft 61, is driven from the latter through a pinion 76 secured to shaft 61 and a gear 77 secured to the jack shaft. At the opposite end of the jack shaft a pinion 78 is secured and this meshes with a gear 79 keyed to a sleeve 80 rotatably mounted on the shaft 61. It will be seen that through the connections indicated, the sleeve 80 will be driven by the shaft 61 but at a reduced speed.

The sprocket 59, which drives the conveyor chain, is mounted loosely upon the sleeve 80. It is driven, however, by the sleeve 80 at the speed of rotation of this sleeve. For this purpose an arm 81 (Figs. 12, 13, 16 and 17) is keyed to the sleeve, this arm being adjustably connected with the sprocket 59, in the manner now to be explained. A swiveled stud 82 is carried by the end of the arm 81 and another swiveled stud 83 is carried by the sprocket wheel 59. A bolt 84 passes freely through the stud 82 and is threaded in the stud 83. The stud 82 is clamped between the head 85 of the bolt and a collar 86 pinned or otherwise secured to the bolt. It will be apparent that upon rotation of the bolt the stud 83 will be brought closer to the stud 82 or will be forced further away from the latter, depending upon the direction of adjustment of the bolt. This will in turn cause an adjustment of the sprocket wheel 59 with respect to the driving mechanism. The purpose of this adjustable connection, as will be made apparent later, is to enable the proper positioning of the molds on the conveyor in relation to the means for supplying measured quantities of molten metal to the molds as they move through a particular zone.

To enable the conveyor and molds to be shifted manually whenever desired, as at the commencement of the operation of the unit, the shaft 61 is provided with a reduced portion 87 (Fig. 12) which is preferably square in cross-section and adapted to receive a handle 88 indicated in dot and dash lines in Fig. 2.

Metal measuring and pouring means

Figures 6, 7:
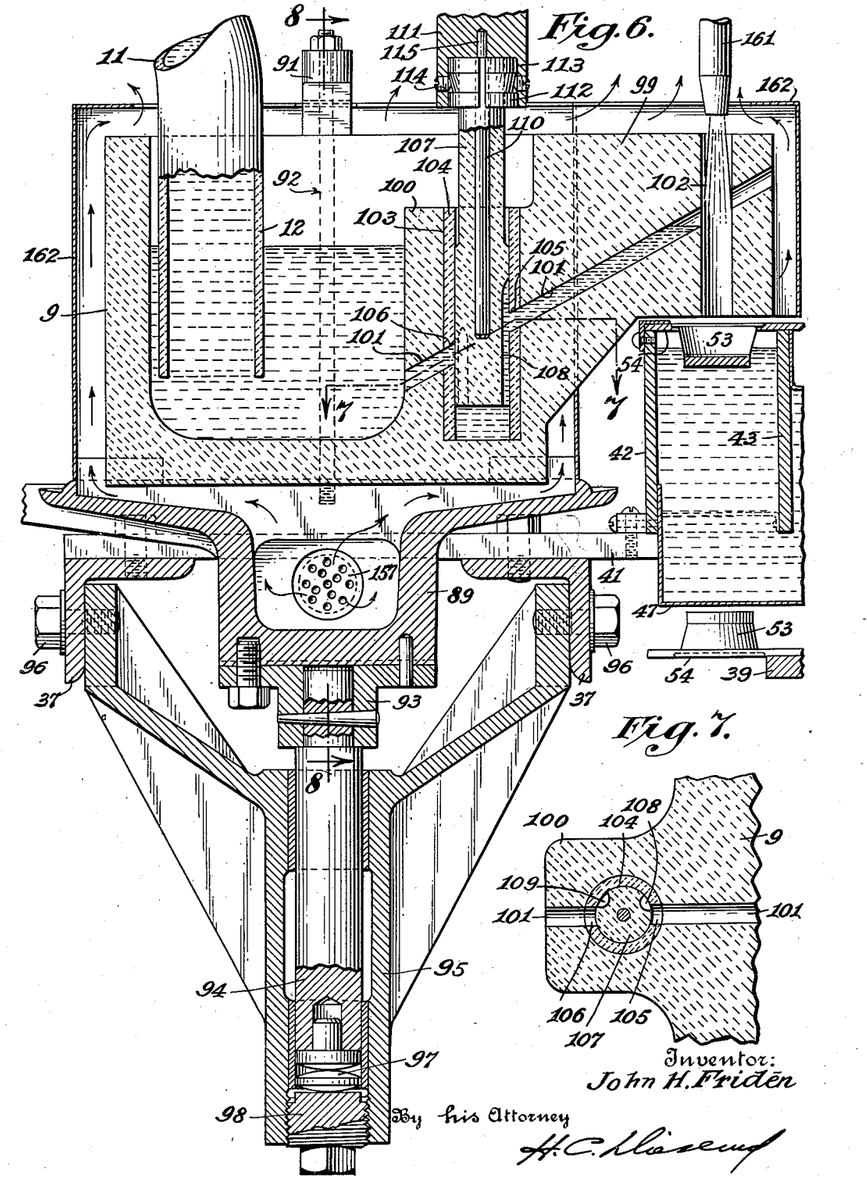
Figure 6 is a transverse sectional view, on an enlarged scale, through the auxiliary chamber and the measuring and pouring devices illustrated in Figure 5.
Figure 7 is a detail view in horizontal section along the line 7—7 of Figure 6.
Figures 8, 9, 10, 11:
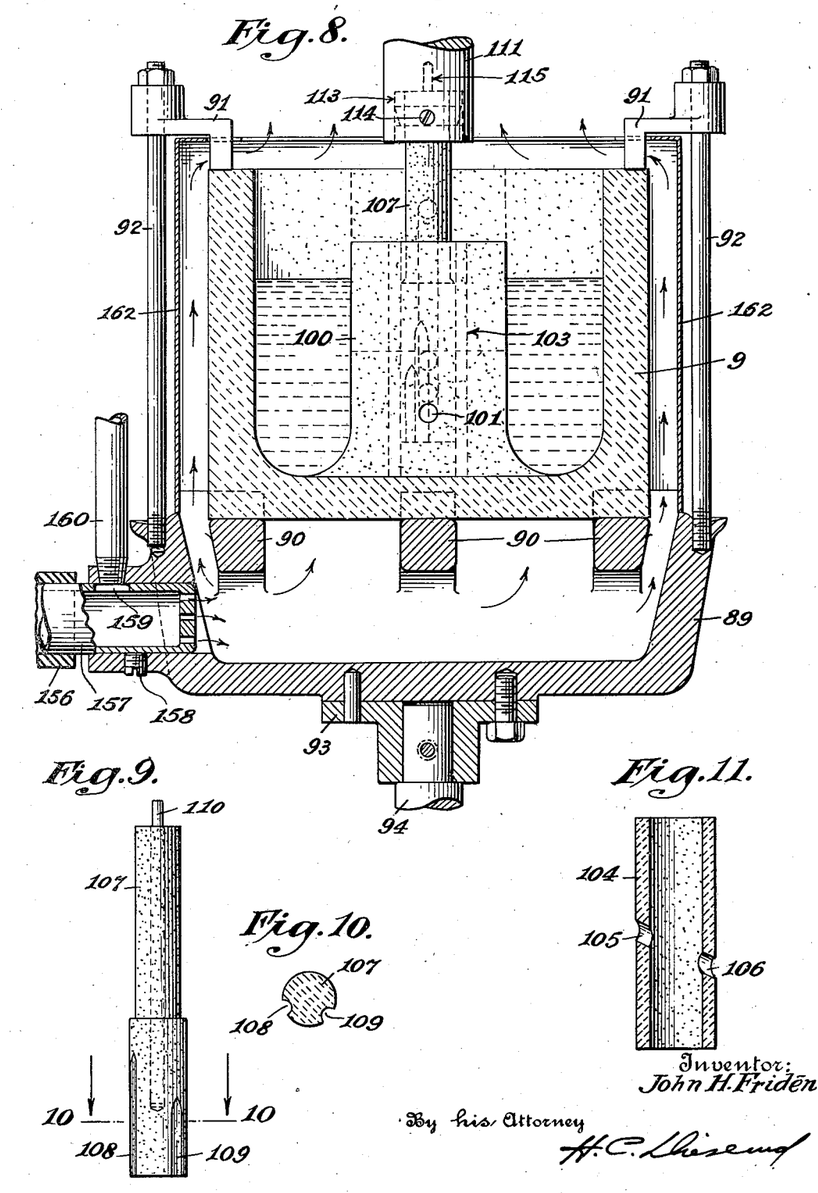
Figure 8 is a detail view in vertical section along the line 8—8 of Figure 6.
Figure 9 is an elevational view of a plunger used in the measuring device.
Figure 10 is a cross-sectional view of the plunger along the line 10—10 of Figure 9.
Figure 11 is a longitudinal, sectional view through a sleeve in which the plunger is operated.

Returning now to the auxiliary chamber 9, from which the molten metal is supplied to the molds of the conveyor, this chamber, as best shown in Figs. 6 and 8, is carried by a casting 89. A plurality of ribs or cross-bars 90, integral with the casting, provide a supporting surface for the base of the auxiliary chamber, these ribs having upstanding lugs at their ends cooperating with the sides of the chamber to asist in positioning it. Clamping members 91, attached to the casting 89 by means of bolts 92, may be provided for securing the chamber to the casting. A plate 93, attached to the bottom of the casting, has a downwardly extending sleeve adapted to surround the upper end of a vertical shaft 94 to which the sleeve is pinned. The shaft 94 is journaled in bearings carried by a bracket 95 which is secured in any suitable way, as by means of screws 96, to the angle members 37 of the main frame. The lower end of the shaft 94 is supported by a thrust bearing 97 which rests upon the upper surface of a plug 98 having screw-threaded engagement with the bracket 95. Adjustment of the plug 98 will serve to raise or lower the shaft 94 and the connected auxiliary chamber. As will be explained later, the chamber may be oscillated in the course of operation of the machine so that a spout portion 99 of the chamber (Figs. 2 and 6) may follow the movement of a mold on the conveyor as metal is being discharged into it. The mounting of the auxiliary chamber is such as to permit this oscillation.

The spout portion of the chamber extends over the cooling tank or trough and the mold-carrying plates 56 of the conveyor, only a slight clearance being provided between the mold-carrying plates and the underside of the spout. In line with the spout there is an inward propection 100 into the interior of the chamber 9, this projection terminating some distance below the top edge of the chamber. An inclined passage 101, of suitable diameter to permit the free flow of the molten metal, is provided from the inner end of the projection 100 to the outer end of the spout 99. This passage is inclined upwardly from its inner to its outer end at an angle of about 30° to the horizontal. A cylindrical opening 102 extends vertically through the spout 99 adjacent its outer end, this opening intersecting the pasage 101 and being so disposed as to communicate with the centers of the molds on the conveyor as they pass beneath the spout.

A projection 100 is provided with a cylindrical well 103 adapted to receive a sleeve 104. This sleeve, preferably formed of some suitable refractory material, has an opening 105 communicating with the upper side of the passage 101 and a similar opening 106 communicating with the lower side of this passage, which in turn communicates with the main body of metal in the chamber 9. A plunger 107, formed of some suitable refractory material similar to that of which the sleeve 104 is formed, is adapted to be both reciprocated and oscillated within the sleeve. The lower portion of the plunger has only a slight clearance, sufficient to provide a good working fit with the sleeve, while the upper portion of the plunger is of reduced diameter to minimize the friction with the sleeve. A groove 108 extending upwardly from the lower end of the plunger to a point above the passage 101 communicates with the latter through the opening 105 in the sleeve when the plunger is rotated to the proper position. Similarly, a groove 109 extending upwardly from the bottom of the plunger 107 is adapted to communicate with the opening 106 in the sleeve and the lower portion of the passage 101 when the plunger is rotated into the proper position for this purpose.

As best indicated in Fig. 7 the grooves 108 and 109 are located about 120° apart. In the operation of the plunger one or the other of these grooves will be placed in communication with the passage 101. Means, which will be described, are provided for reciprocating and oscillating the plunger in such a way that, as the plunger rises it will be turned into a position in which the groove 109 communicates with the lower portion of the passage 101, thereby admitting molten metal beneath the plunger. At the same time the groove 108 is preferably carried out of communication with the upper portion of the passage 101. Before the plunger commences its downward movement, it is rotated to carry the groove 109 out of communication with the opening 106 and to carry the groove 108 into communication with the opening 105. The plunger is then moved downwardly and the molten metal beneath it is forced upwardly through the groove 108 and through the passage 101 over the lip formed between this passage and the opening 102. A measured quantity of the metal, determined by the stroke of the plunger, will thus be discharged through the opening 102 into the mold which at that moment happens to be beneath the opening 102.

The plunger and the sleeve 104, or at least one of them, may be formed of a graphite composition. This material is capable of withstanding the heat of the molten metal, will not react with zinc or the like and has other characteristics which render it suitable for the purpose. It appears to have a self-lubricating action in the reciprocation and oscillation of the plunger. If desired the sleeve and plunger may be formed of substantially pure tungsten, which has all of the required properties but is almost prohibitively expensive. To minimize the expense the sleeve may be formed from soapstone and then fired at a suitable temperature. The resulting product has the desired characteristics and works well with a tungsten plunger. The graphite composition, while inexpensive, does not have good wear-resisting qualities and, therefore, if it is used, the plunger and sleeve must be replaced rather frequently. For this reason the means for operating the plunger should be so constructed as to enable the plunger and the sleeve 104 to be replaced with a minimum of time and effort. These operating means, furthermore, should be readily adjustable as to stroke to allow for wear of the parts and also to enable the delivery of variable amounts of metal for slugs of different weights.

Preferably the plunger is built around a metal core 110 (Fig. 9) which extends above the refractory material. The upper end of the plunger is adapted to be received and operated by a socket member 111. In the preferred construction the upper end of the plunger 107 is adapted to be simply inserted in and frictionally retained by a split collar 112 (Figs. 5A, 6 and 8) inserted in an opening 113 in the bottom of the member 111. Set-screws 114, passing through the wall of the member 111 into the opening in its lower end, are adapted to engage the split collar to retain it and urge it under the proper tension against the inserted plunger. An aperture 115, communicating with the opening 113, is adapted to receive the extension 110 of the metal core of the plunger.

For the purpose of reciprocating the plunger, there is provided around a reduced upper portion 111a of the member 111 a sleeve 116 (Fig. 5A) having a laterally extending arm 117 apertured to receive a rod 118. A collar 111b, pinned to the upper end of the portion 111a, serves to tie the member 111 and sleeve 116 together for axial movement in unison; although these parts may rotate relative to each other. Spaced collars 119 are provided on the rod 118 at opposite sides of the arm 117 and a nut 120, threaded to the lower end of the rod, serves to hold the parts together. The rod 118 is slidably mounted in appropriate bearings carried by a sleeve 121, preferably formed integral with a bar 122. The latter is bolted or otherwise secured to the upper ends of a pair of brackets 123 and 124 attached to one of the angle members 37 of the main frame structure.

Figure 14:
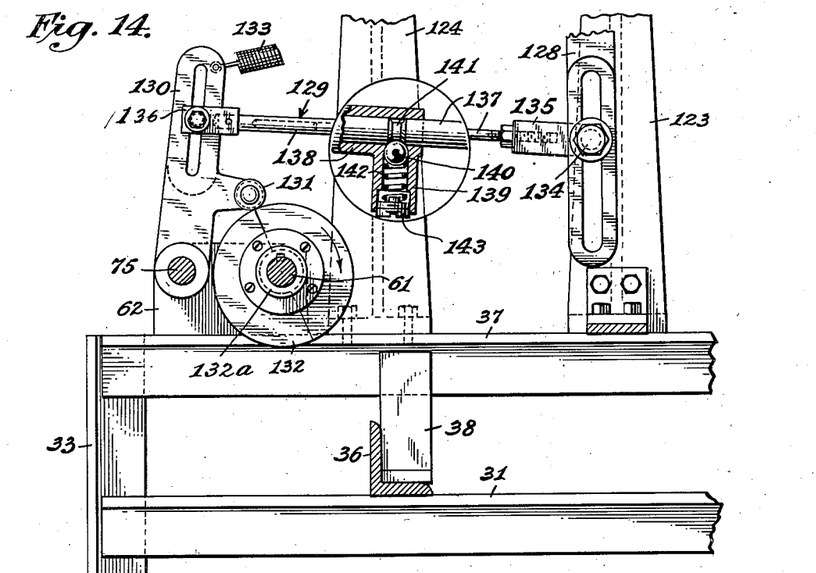
Figure 14 is an elevational view, partly in section, along the line 14—14 of Figure 13, illustrating certain of the operating devices for the measuring and pouring means, a safety release in a connection provided between two levers being illustrated in section within the circle on a magnified scale.

The rod 118 is straddled by the forked end 125 of one arm 126 of a bell crank pivotally mounted on a pin 127, extending from the bracket 123. Arm 126 is adapted to actuate the rod 118 longitudinally by virtue of the engagement of the forked end between the upper collar 119 and a collar 125a pinned to the rod 118. A depending arm 128 of the bell crank is connected by means of a link 129 with a lever 130 pivotally mounted upon the jack shaft 75. Lever 130 has a forwardly extending arm which carries a roller 131 (Fig. 14) cooperating with the periphery of a cam 132. Preferably the cam 132 is formed in two parts to facilitate its removal and the substitution of another cam of different form. It may be secured by screws to the flange of a hub 132a keyed to the shaft 61. A spring 133 serves to draw the arm 130 in a counter-clockwise direction (Fig. 5) and retains the roller 131 against the periphery of the cam. The extent of movement of the rod 118, and hence of the plunger, is made variable by adjusting the position of the end of the link 129 with respect to the arm 128 of the bell crank. For this purpose the arm 128 is provided with an elongated slot in which a bolt 134 may be shifted to any desired position and then tightened to clamp a yoke 135 at the end of the link 129. Similarly, at its opposite end the link 129 is provided with a block 136 adjustable in an elongated slot in the lever 130 and adapted to be locked in any position of adjustment in said slot.

The link 129 is preferably formed in two parts, a rod 137 and a sleeve 138, which are in telescoping relation. The sleeve 138 has a downwardly extending cylinder 139 in which there is mounted a ball 140 urged into a groove 141 in the rod 137, by means of a spring 142. This construction is shown on a magnified scale within the circle in Fig. 14. A plug 143 serves to retain the spring in the cylinder and provides a means of adjusting the tension of the spring. It will be apparent that this type of connection is releasable so that if there is excessive resistance to the movement of the plunger and its connected parts, the rod 137 will simply slide in the sleeve 138, urging the ball 140 outwardly against the action of the spring.

Figure 15:
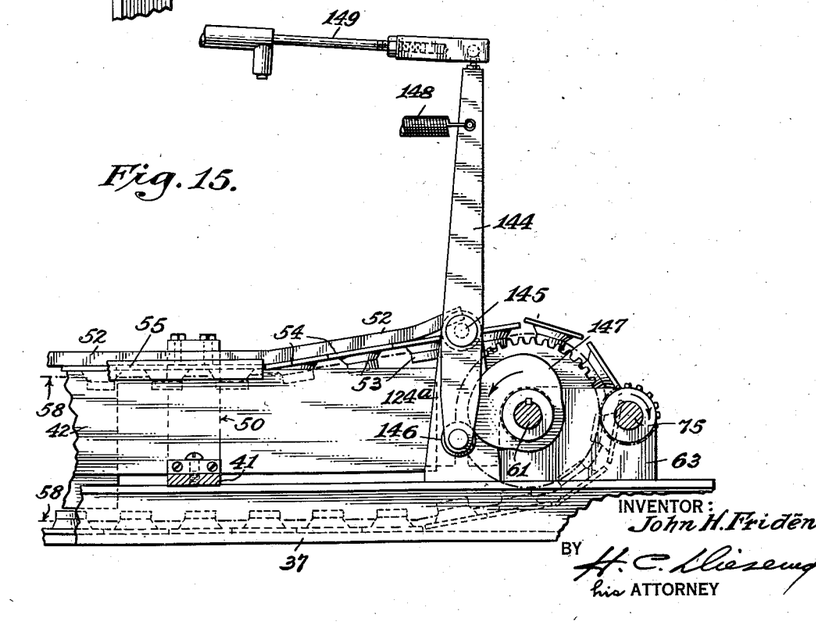
Figure 15 is a vertical section on the same line as Figure 14 but in the direction of the arrows 15—15 of Figure 13.
Figure 16:
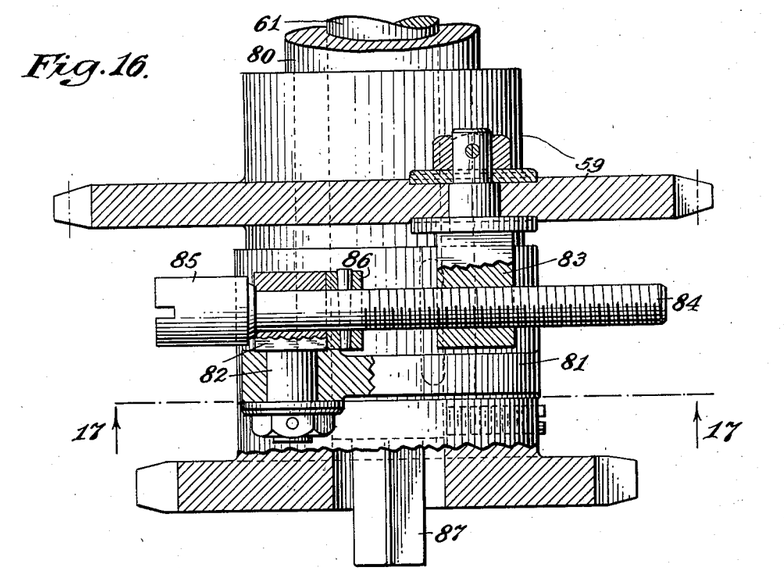
Figure 16 is an enlarged detail view, partly in plan and partly in horizontal section, illustrating particularly a portion of the driving means for the mold-carrying conveyor.

Oscillatory movement is imparted to the plunger by means similar to that provided for its reciprocation. (See Figs. 5, 5A, 12, 13 and 15.) A lever 144 pivoted at 145 upon a bracket 124a carries a roller 146 at its lower end adapted to engage the periphery of a cam 147 secured to the shaft 61. A spring 148 urges the lever in a counter-clockwise direction (Figs. 5 and 15) for this purpose. At its upper end the lever is connected by a link 149 with an arm 150 extending laterally from a sleeve 151 rotatably mounted on the rod 118 between the collar 125a and another collar 125b. The link 149 is preferably of a releasable type similar to the link 129. Another arm 152, extending laterally from the sleeve 151 in a direction at about 90° to that of the arm 150, is connected by a link 153 with an arm 154 integral with the collar 111b secured to the upper end of the extension 111a of the member 111.

Figure 23:
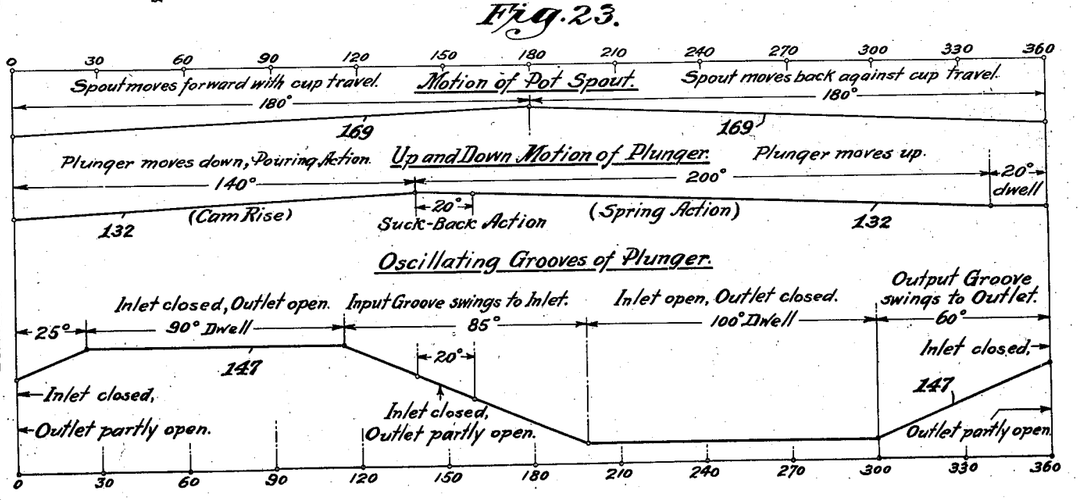
Figure 23 is a diagram indicating the relative timing of various operating devices embodied in the apparatus.

The timing of the cams 132 and 147 is such as to bring about the previously explained movements of the plunger. This timing is indicated in the chart of Fig. 23. During the first 140° of the cycle indicated in the chart, the plunger is moved downwardly, causing the metal to be pumped and discharged into the mold which happens at the moment to be beneath the opening 102. At the beginning of this part of the cycle, the groove 109 will be in its closed position, i. e., out of register with the opening 106 in the sleeve. The groove 108, on the other hand, will at this time be partly registered with the opening 105, as indicated in Fig. 7. The outlet is fully opened during the first 25° of the cycle and remains in this condition for the next 90° while the inlet remains closed throughout both of these periods. Following this the plunger is rotated in the opposite direction to partly and then fully close the outlet and to finally open the inlet. The inlet, however, does not open until after the downward movement of the plunger has ceased and it is not fully opened until about the 200° point in the cycle.

Following the initial 140° portion of the cycle, the plunger is moved upwardly under the action of the spring 133, as permitted by cam 132. This upward movement extends over about a 200° portion of the cycle. For approximately 20° of this upward movement of the plunger, the outlet remains partly open and, therefore, a slight suckback action takes place which insures a relatively sharp cutting off of the flow of metal through the opening 102 into the mold. The metal in the passage 101, or at least a portion of it, returns to the well beneath the plunger. During the major part of the upward movement of the plunger, however, the outlet will be closed and the inlet either partially or fully open. When the cycle is within about 60° of completion and while the plunger is still moving upward, it is oscillated back toward the position in which the inlet is closed and the outlet is partially opened. By the time the outlet commences to open, the plunger has stopped its upward movement and is being held stationary by a slight 20° dwell in the cam 132. The same cycle is then ready to be repeated.

*Auxiliary heating means*

Means are provided for heating the metal in the auxiliary chamber so as to maintain it in the proper molten state until it is actually deposited in the molds. For this purpose, a flexible hose, or similar connection, 156 is provided from the top of the gas line 26 (Figs. 1 and 2) above the point at which the branch line 27 is taken off. This flexible hose is attached at its other end to a burner element 157, which is inserted in a passage in the bottom of the member 89 and is retained therein by a set-screw 158. At the top of the burner 157 there is an opening 159 which communicates with a tube or pipe 160. The pipe 160 extends upwardly along the side of the auxiliary chamber and over the top of the chamber and is provided with a burner element 161 at its free end directly over the passage 102 in the spout portion 99 of the chamber. (See Fig. 6.) A flame is thus discharged downwardly through the passage 102 at all times to insure maintenance of the proper molten state of the metal until it reaches the molds. The hot gases developed by the burner 157 follow the courses indicated by the arrows in Fig. 8. These gases in rising around the auxiliary chamber are confined between the latter and an outer casing or shell 162 which directs the gases inwardly at the top of the chamber and then permits their free discharge into the atmosphere.

*Spout oscillating means*

Figures 5, 5A:
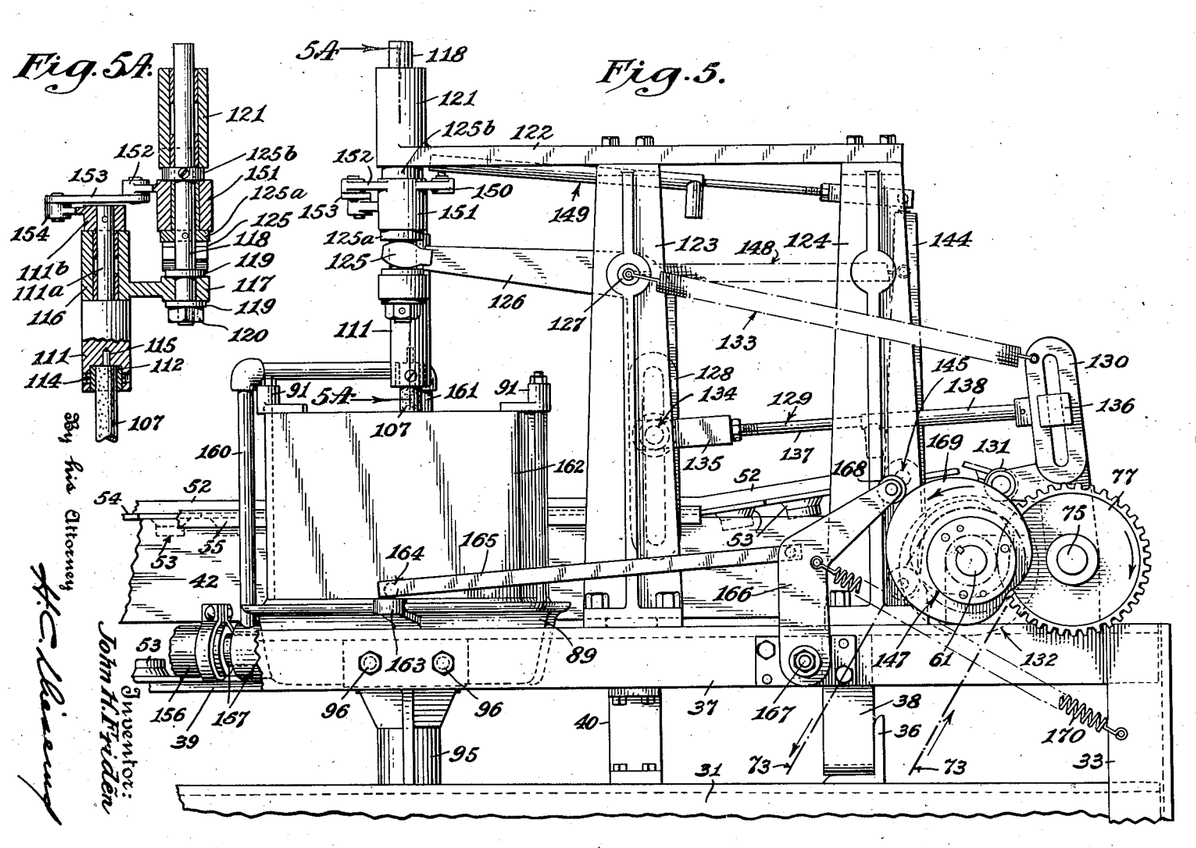
Figure 5 is a rear elevation of a portion of the apparatus disclosing particularly the operating means for the metal pouring and measuring devices.
Figure 5A is a detail view in section of a portion of the devices illustrated in Figure 5 and is taken along the line 5a—5a of Figure 5.

Means may be provided for rocking the auxiliary chamber about the axis of the supporting shaft 94. For this purpose (as best shown in Fig. 5) the casting 89 is provided with a rearwardly extending arm 163 which has a swivel connection at 164 with a link 165 pivotally attached at its opposite end to a lever 166. This lever is pivotally supported at 167 on one of the angle members 37 of the main frame and carries at its upper free end a roller 168 adapted to engage the periphery of a heart-shaped cam 169. A spring 170 serves to draw the lever in a clockwise direction (Fig. 5) to engage the roller with the cam. It will be understood that the shape and timing of the cam 169 is such that the passage 102 of the spout 99 will follow the movement of the mold that happens to be beneath it at the time the plunger 107 is descending to pump and discharge a measured quantity of the metal. After the desired quantity of metal has been introduced into the mold, the spout will, of course, swing back to a position centrally over the next mold and will follow that in the same way during the next filling operation. Oscillation of the spout may be dispensed with, if desired, and the action of the pump so timed, that the metal will be discharged into each mold between the times that its leading and following edges reach the pouring opening 102.

Mold vibrating means

To free any air or gas bubbles from the metal and to cause it to spread out evenly over the bottom of the mold, provision is made for vibrating the mold while the metal is being introduced into it and before it solidifies. This vibrating means comprises a toothed wheel 171 (Fig. 1) secured to the shaft 61 and cooperating with a roller 172 carried by one end of a lever 173 pivoted at 174 on a portion of the frame. Spring 175 tends to rock the lever clockwise (Fig. 1) and urges the roller 172 into engagement with the toothed wheel 171. At its opposite end the lever 173 is provided with a hammer element 176, which is adapted to pass through an opening 177 provided in the bar 52 at a point substantially in line with the spout of the auxiliary chamber. It will be understood that as metal is being poured into one of the molds and for a short time thereafter, the hammer 176, which is being continuously vibrated by the toothed wheel 171 at a relatively rapid rate, will strike the supporting plate of the mold.

Figure 21:
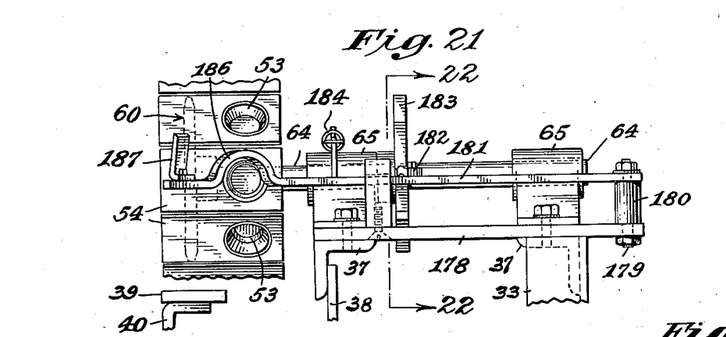
Figure 21 is an end view of a portion of the apparatus, showing in detail certain devices at the point where the slugs are discharged from the molds.
Figure 22:
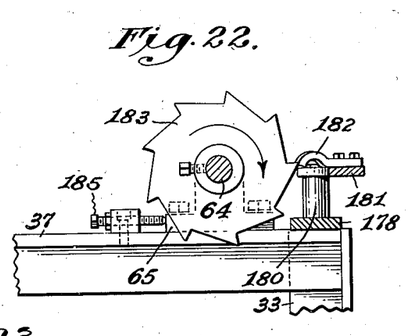
Figure 22 is a vertical section along the line 22—22 of Figure 21.

As the molds are carried around the sprocket 60, the slugs, which will have been fully solidified by this time due to the cooling action of the water in the trough, are discharged. To assist in their discharge as the molds are turned on edge in passing around the sprocket, means are provided for vibrating or shaking the molds. For this purpose a supporting bar 178 (Fig. 21) extends transversely across the tops of the angle members 37 adjacent one end and is suitably secured thereto. The bar extends beyond the angle member on the right (Fig. 21) and is apertured to receive a bolt 179. A spacer collar 180, surrounding the bolt, supports, at its upper end, one end of a lever 181 adapted to swing pivotally about the bolt 179. About midway of the length of the lever 181, it carries a finger 182 having its end slightly bent (as best shown in Fig. 22). This bent end of the finger cooperates edgewise with a ratchet wheel 183 secured to the shaft 64. As the latter rotates during the advance of the conveyor, the finger 182 will be cammed outwardly until it reaches one of the shoulders provided by the teeth of the ratchet wheel and it will then move suddenly inwardly. A spring 184, connected with the lever 181 and with a portion of the frame, serves to hold the finger 182 against the ratchet wheel and causes the latter to oscillate as the ratchet rotates. Incidentally, the shaft 64, to which the ratchet wheel is secured and which is carried by the bearings 65, is adjustable to provide the desired amount of slack in the conveyor. Set-screws 185 are provided for the adjustment of the bearings which are then clamped by the bolts shown.

Adjacent its outer end the lever 181 is bent upwardly in semi-circular form, as indicated at 186, so as not to extend directly across the front of a mold as it is brought into its substantially vertical position. This is to avoid interference with the discharge of the slug from the mold at this point. Beyond the curved portion of the lever there is secured a hammer element 187 which, upon each sudden inward movement of the lever as the finger 182 reaches the successive shoulders of the ratchet wheel, strikes the adjacent mold-supporting plate and causes it to vibrate sufficiently to release the slug as the mold is carried into a vertical position. As the slugs are so discharged they fall by gravity into a chute 188, from which they may be directed into a bucket or may be delivered to any other point.

Summary of operation

It is believed that the operation of the furnace and molding unit will be clear from the foregoing but a brief resumé will now be given:

Assuming that the furnace has been brought to the proper temperature, and the bodies of metal in the fire pot 4 and in the crucible are in a molten state, the mechanism is set in operation, the syphon being subjected to a partial vacuum and being started to maintain molten metal in the auxiliary chamber 9 at substantially the same level as in the crucible 7. The conveyor is set in operation and the pump plunger is caused to reciprocate while the auxiliary chamber is rocked about its axis at the appropriate speed and in the correct timing to retain the pouring passage 102 directly over one of the molds during the downward movement of the plunger. A measured quantity of molten metal is thus introduced into a mold and the auxiliary chamber is then rocked back to its initial position, in which the pouring passage 102 is placed over the next succeeding mold and is caused to travel along with this during the next downward movement of the plunger. Since the metal delivered to the molds is taken from a point well below the surface of the mass in crucible 7 and is also pumped from a point well below the surface of the metal in the auxiliary chamber, its purity and cleanliness is insured. It is quite free of the dirt, slag, scale, oxidized metal and other impurities which form on or rise to the surface in the crucible and auxiliary chamber.

As the metal is being poured into the molds and for a suitable period thereafter, the molds are being carried along with their lower portions immersed in the water in the elongated trough. This causes the metal to quickly solidify and cool after it has been deposited in the molds. During the pouring operation and immediately subsequent thereto, the mold is vibrated by the operation of the hammer 176, thus insuring the release of any gas that might otherwise be retained and causing the surface of the metal to level off. As the molds reach the end of the trough, the metal slugs are well solidified and the molds are carried upwardly over the dam 67 and around the sprocket 60. Here the mold plates are subjected to further vibration by the hammer element 187 which causes the slugs to become loosened and drop by gravity into the chute 186.

While an illustrative form of apparatus, embodying the present invention, has been disclosed in considerable detail, it will be understood that numerous changes may be made in the construction and arrangement of the several parts without departing from the general spirit and scope of the invention. The terms employed herein are to be considered as terms of description and not of limitation.

I claim:

1. Apparatus for casting slugs of the character described which comprises means for melting metal and for retaining a mass of molten metal, means for supporting a plurality of slug forming molds, means for delivering a measured quantity of molten metal from said retaining means to each of said molds successively, said delivering means comprising an auxiliary chamber, means for transferring metal from beneath the surface thereof in said retaining means to said auxiliary chamber and means for transferring measured quantities of said metal from beneath the surface thereof in the auxiliary chamber and while out of substantial contact with air to said molds, means for cooling said molds, and means for discharging the solidified slugs from said molds.

2. Apparatus for casting slugs of the character described which comprises means for retaining a mass of molten metal, means for supporting a plurality of slug forming molds, means for delivering a measured quantity of molten metal from said retaining means to each of said molds successively, means for shifting said molds and said delivering means in unison as the metal is being delivered to one of the molds and relative to each other at other times, means for vibrating said molds upon the delivery of molten metal thereto, and means for automatically discharging the slugs from said molds after the slugs have solidified.

3. Apparatus for casting slugs of the character described which comprises means for retaining a mass of molten metal, means for supporting a plurality of slug forming molds, means for delivering a measured quantity of molten metal from said retaining means to each of said molds successively, said delivering means comprising an auxiliary chamber, means for transferring metal from beneath the surface thereof in said retaining means to said auxiliary chamber and means for transferring measured quantities of said metal from beneath the surface thereof in the auxiliary chamber and out of substantial contact with air to said molds, means for supplying heat to said metal in said retaining means and auxiliary chamber, means for cooling said molds, and means for discharging the solidified slugs from said molds.

4. Apparatus for casting slugs of the character described which comprises means for retaining a mass of molten metal, auxiliary means for retaining a smaller mass of molten metal, means for delivering metal from said retaining means to said auxiliary means, a plurality of molds, means for delivering the molten metal from said auxiliary means to said molds, means for rocking said auxiliary means about an axis passing through the same as the metal is being delivered therefrom, and means for heating said retaining means, auxiliary means, and said several delivering means.

5. Apparatus for casting slugs of the character described which comprises means for retaining a mass of molten metal, auxiliary means for retaining a smaller mass of molten metal, means for delivering metal from said retaining means to said auxiliary means and maintaining the metal at substantially the same level in said retaining and auxiliary means, a plurality of molds, means for delivering the molten metal from said auxiliary means to said molds, and means for heating said retaining means and auxiliary means.

6. Apparatus for casting slugs of the character described which comprises means for retaining a mass of molten metal, auxiliary means for constantly retaining a substantially uniform smaller mass of molten metal, means for delivering metal from said retaining means to said auxiliary means as it is being discharged from the latter, a plurality of molds, means for delivering measured quantities of the molten metal from said auxiliary means to said molds, and means for heating said retaining means and auxiliary means.

7. In apparatus of the class described a chamber for retaining molten metal, a well associated with said chamber and arranged to receive metal therefrom, means communicating with said well for transferring metal discharged therefrom, a plunger operable within said well, and means for reciprocating and oscillating said plunger, said plunger having channels rendered effective and ineffective upon oscillation thereof to admit metal from said chamber to said well and to enable the discharge of the same from said well upon the downward movement of the plunger.

8. In apparatus of the class described a chamber for retaining molten metal, a well associated with said chamber, the wall of said well having a passage communicating with said chamber to deliver molten metal therefrom to said well, a refractory sleeve fitted snugly within said well, said sleeve having an aperture alined with said passage and also having a discharge aperture, a plunger formed of refractory material having a sliding fit within said sleeve, said plunger having channels therein adapted to be carried into and out of registry with said apertures upon oscillation of the plunger, and means for oscillating and reciprocating said plunger.

9. In apparatus of the class described a chamber for retaining molten metal, a well associated with said chamber, the wall of said well having a passage communicating with said chamber to deliver molten metal therefrom to said well, a refractory sleeve fitted snugly within said well, said sleeve having an aperture alined with said passage and also having a discharge aperture, a plunger formed of refractory material having a sliding fit within said sleeve, said plunger having channels therein adapted to be carried into and out of registry with said apertures upon oscillation of the plunger, an operating member arranged to be reciprocated and oscillated, and readily detachable connections between said member and plunger for imparting the movements of said member to the plunger.

10. In apparatus of the class described a chamber for retaining molten metal, a well associated with said chamber, the wall of said well having a passage communicating with said chamber to deliver molten metal therefrom to said well, a refractory sleeve fitted snugly within said well, said sleeve having an aperture alined with said passage and also having a discharge aperture, a plunger formed of refractory material having a sliding fit within said sleeve, said plunger having channels therein adapted to be carried into and out of registry with said apertures upon oscillation of the plunger, an operating member having a socket portion adapted to receive and frictionally retain a portion of said plunger, and means for reciprocating and oscillating said member.

11. In apparatus of the class described a chamber for retaining molten metal, a pump associated with said chamber, said pump having a well arranged to receive molten metal from said chamber and having a plunger adapted to be reciprocated and oscillated within said well, said plunger being formed of refractory, self-lubricating material, means for automatically reciprocating and oscillating said plunger, and readily accessible means for varying the reciprocatory stroke of said plunger.

12. In apparatus of the class described a reservoir for molten metal, a well connected with said reservoir and adapted to receive metal therefrom, a plunger arranged to fit said well and to be reciprocated and oscillated therein, oscillation of said plunger being arranged to control the delivery of metal to and its discharge from said well, a spout connected with said well and arranged to receive metal therefrom upon reciprocation of said plunger, means for reciprocating and oscillating said plunger, a mold arranged to receive metal discharged from said spout, and means synchronized with said reciprocating and oscillating means for shifting said mold and said spout in unison as metal is being discharged from said spout.

13. In apparatus of the class described a reservoir for molten metal, a well connected with said reservoir and arranged to receive metal therefrom, a plunger formed of refractory material fitting within said well, means for oscillating and reciprocating said plunger, operating means, and separate connections from said operating means each releasable under excessive load for operating said oscillating and reciprocating means.

14. In apparatus of the class described a plurality of molds, each of said molds being carried by a plate, said plates being connected to provide a continuous conveyor, means for shifting said conveyor, means for delivering measured quantities of molten material to said molds as they are in a predetermined zone, and means for striking said plates to vibrate the same while in said zone as the molten material is solidifying.

15. In apparatus of the class described a plurality of molds, each of said molds being carried by a plate, said plates being connected to provide a continuous conveyor, means for shifting said conveyor, means for delivering measured quantities of molten material to said molds as they are in a predetermined zone, means for striking said plates to vibrate the same while in said zone as the molten material is solidifying, and means for striking said plates after the material has solidified in the molds carried thereby to loosen said material.

16. In apparatus of the class described a reservoir for molten metal, an auxiliary chamber adjacent said reservoir, and means for continuously transferring molten metal from said reservoir to said chamber which comprises a syphon, said syphon having a pair of legs connected by a cross member, one of said legs extending a substantial distance above said cross member and means connected with the extension of said leg for subjecting said syphon to a substantially fixed, partial vacuum.

17. A method of casting a series of similar articles which comprises melting the material to be cast in a crucible, transferring the molten material from a point beneath the surface thereof to a pouring vessel adapted to retain sufficient metal for a plurality of molds, constantly maintaining substantially the same amount of metal in said vessel, continuously advancing a series of molds past the pouring outlet of said vessel, and intermittently discharging the molten material from a point beneath the surface thereof in said vessel as the molds are successively carried past the pouring outlet.

JOHN H. FRIDÉN.